United States Patent
Barlow, Jr. et al.

(10) Patent No.: US 10,913,022 B2
(45) Date of Patent: *Feb. 9, 2021

(54) PROCESS FOR UTILIZING A HIGH EFFICIENCY SYNTHETIC FILTER MEDIA

(71) Applicant: Knowlton Technologies, LLC, Watertown, NY (US)

(72) Inventors: Richard Frank Barlow, Jr., Evans Mills, NY (US); Keh Dema, Johnson City, TN (US)

(73) Assignee: Knowlton Technologies, LLC, Watertown, NY (US)

(*) Notice: Subject to any disclaimer, the term of this patent is extended or adjusted under 35 U.S.C. 154(b) by 101 days.

This patent is subject to a terminal disclaimer.

(21) Appl. No.: 15/937,010

(22) Filed: Mar. 27, 2018

(65) Prior Publication Data
US 2018/0280846 A1    Oct. 4, 2018

Related U.S. Application Data

(60) Provisional application No. 62/478,074, filed on Mar. 29, 2017.

(51) Int. Cl.
| | | |
|---|---|---|
| *B01D 39/18* | (2006.01) | |
| *B01D 39/16* | (2006.01) | |
| *B01D 39/20* | (2006.01) | |
| *D04H 1/65* | (2012.01) | |
| *D04H 1/4382* | (2012.01) | |
| *D04H 1/425* | (2012.01) | |
| *D04H 1/732* | (2012.01) | |
| *D04H 1/4258* | (2012.01) | |
| *B01D 39/10* | (2006.01) | |
| *D01F 2/28* | (2006.01) | |

(52) U.S. Cl.
CPC ............ *B01D 39/18* (2013.01); *B01D 39/10* (2013.01); *B01D 39/163* (2013.01); *B01D 39/1661* (2013.01); *B01D 39/2013* (2013.01); *B01D 39/2024* (2013.01); *D04H 1/425* (2013.01); *D04H 1/4258* (2013.01); *D04H 1/4382* (2013.01); *D04H 1/65* (2013.01); *D04H 1/732* (2013.01); *B01D 2239/02* (2013.01); *B01D 2239/0208* (2013.01); *B01D 2239/064* (2013.01); *B01D 2239/0618* (2013.01); *B01D 2239/0636* (2013.01); *B01D 2239/086* (2013.01); *B01D 2239/10* (2013.01); *B01D 2239/1216* (2013.01); *B01D 2239/1225* (2013.01); *B01D 2239/1233* (2013.01); *B01D 2239/1258* (2013.01); *D01F 2/28* (2013.01)

(58) Field of Classification Search
None
See application file for complete search history.

(56) References Cited

U.S. PATENT DOCUMENTS

| | | | | |
|---|---|---|---|---|
| 3,314,845 | A * | 4/1967 | Perri | D04H 11/00 428/90 |
| 4,594,202 | A | 6/1986 | Pall et al. | |
| 4,973,382 | A | 11/1990 | Kinn et al. | |
| 5,057,368 | A * | 10/1991 | Largman | D01D 5/253 264/177.13 |
| 5,154,908 | A * | 10/1992 | Edie | D01D 5/253 264/29.2 |
| 5,240,610 | A * | 8/1993 | Tani | B01D 29/11 210/497.1 |
| 5,597,645 | A * | 1/1997 | Pike | B01D 39/1623 210/243 |
| 6,315,806 | B1 | 11/2001 | Torobin et al. | |
| 6,379,564 | B1 * | 4/2002 | Rohrbach | B01D 37/025 210/209 |
| 6,743,273 | B2 | 6/2004 | Chung et al. | |
| 6,746,517 | B2 | 6/2004 | Benson et al. | |
| 6,758,878 | B2 | 7/2004 | Choi et al. | |
| 6,767,498 | B1 | 7/2004 | Talley, Jr. et al. | |
| 6,872,311 | B2 | 3/2005 | Koslow | |
| 6,893,711 | B2 | 5/2005 | Williamson | |
| 7,008,465 | B2 | 3/2006 | Graham et al. | |
| 7,026,033 | B2 | 4/2006 | Fujimori | |
| 7,097,694 | B1 | 8/2006 | Jaroszczyk et al. | |

(Continued)

FOREIGN PATENT DOCUMENTS

| | | |
|---|---|---|
| WO | WO 2014 164127 | 10/2014 |
| WO | WO 2015 095732 | 6/2015 |

OTHER PUBLICATIONS

Co-pending U.S. Appl. No. 15/936,968, filed Mar. 27, 2018; Barlow and Dema; now U. S. Patent Publication No. 2018 0280845.

(Continued)

*Primary Examiner* — Chester T Barry
(74) *Attorney, Agent, or Firm* — Polly C. Owen

(57) ABSTRACT

The present invention is generally related to a high capacity, high efficiency nonwoven filtration media comprising a gradient pore structure. In particular, the filtration media can comprise thermoplastic synthetic microfibers, fibrillated fibers, staple fibers, and a binder. Furthermore, the filtration media may be produced without the use of glass fibers or microglass fibers. A process for making the filtration media is also provided. Consequently, the filtration media of the present invention does not cause the same issues as conventional filtration media that comprises glass fibers and/or microglass fibers. Moreover, the filtration media can be used to treat fuel, lubrication fluids, hydraulic fluids, and various other industrial gases.

12 Claims, No Drawings

(56) References Cited

U.S. PATENT DOCUMENTS

| | | | |
|---|---|---|---|
| 7,147,311 B2* | 12/2006 | Stellbrink | B41J 2/17513 |
| | | | 347/86 |
| 7,195,814 B2 | 3/2007 | Ista et al. | |
| 7,228,973 B2 | 6/2007 | Simon | |
| 7,309,372 B2 | 12/2007 | Kahlbaugh et al. | |
| 7,314,497 B2 | 1/2008 | Kahlbaugh et al. | |
| 7,390,760 B1 | 6/2008 | Chen et al. | |
| 7,445,834 B2 | 11/2008 | Morin | |
| 7,691,168 B2 | 4/2010 | Fox | |
| 7,704,595 B2 | 4/2010 | Morin | |
| 7,717,975 B2 | 5/2010 | Kalayci et al. | |
| 7,754,123 B2 | 7/2010 | Verdegan et al. | |
| 7,757,811 B2 | 7/2010 | Fox et al. | |
| 7,789,930 B2 | 9/2010 | Ensor et al. | |
| 7,918,913 B2 | 4/2011 | Kalayci et al. | |
| 7,989,369 B2 | 8/2011 | Bond et al. | |
| 8,002,990 B2 | 8/2011 | Schroeder et al. | |
| 8,012,312 B2 | 9/2011 | Goto et al. | |
| 8,057,567 B2 | 11/2011 | Webb et al. | |
| 8,083,828 B2 | 12/2011 | Smith | |
| 8,105,682 B2 | 1/2012 | Sun | |
| 8,177,876 B2 | 5/2012 | Kalayci et al. | |
| 8,211,218 B2 | 7/2012 | Dallas et al. | |
| 8,236,082 B2 | 8/2012 | Witsch | |
| 8,257,459 B2 | 9/2012 | Healey | |
| 8,263,214 B2 | 9/2012 | Kalayci et al. | |
| 8,282,712 B2 | 10/2012 | Chi et al. | |
| 8,293,107 B1* | 10/2012 | Lobovsky | B01D 17/0202 |
| | | | 210/321.79 |
| 8,303,693 B2 | 11/2012 | Leung | |
| 8,322,487 B1 | 12/2012 | Kitchen et al. | |
| 8,357,220 B2 | 1/2013 | Guimond | |
| 8,361,180 B2 | 1/2013 | Lim | |
| 8,361,278 B2 | 1/2013 | Fike et al. | |
| 8,366,797 B2 | 2/2013 | Chung et al. | |
| 8,383,529 B2 | 2/2013 | Ono et al. | |
| 8,512,431 B2 | 8/2013 | Chung et al. | |
| 8,512,569 B2 | 8/2013 | Eaton et al. | |
| 8,523,971 B2 | 9/2013 | Leung | |
| 8,524,041 B2 | 9/2013 | Gupta | |
| 8,540,846 B2 | 9/2013 | Miller et al. | |
| 8,545,587 B2 | 10/2013 | Guimond | |
| 8,545,590 B2 | 10/2013 | Witsch | |
| 8,556,089 B2 | 10/2013 | Kalayci et al. | |
| 8,632,658 B2 | 1/2014 | Miller et al. | |
| 8,641,796 B2 | 2/2014 | Rogers | |
| 8,679,217 B2 | 3/2014 | Chi | |
| 8,679,218 B2 | 3/2014 | Wertz | |
| 8,689,985 B2 | 4/2014 | Bates, III et al. | |
| 8,758,559 B2 | 6/2014 | Vallery | |
| 8,778,046 B2 | 7/2014 | Witsch | |
| 8,778,047 B2 | 7/2014 | Witsch | |
| 8,882,876 B2 | 11/2014 | Battenfeld et al. | |
| 8,906,815 B2 | 12/2014 | Moore | |
| 8,932,704 B2 | 1/2015 | Porbeni et al. | |
| 8,956,504 B2 | 2/2015 | Vallery | |
| 8,980,055 B2 | 3/2015 | Sumnicht | |
| 9,027,765 B2 | 5/2015 | Battenfeld et al. | |
| 9,149,748 B2 | 10/2015 | Nagy | |
| 9,180,393 B2 | 11/2015 | Chen et al. | |
| 9,186,608 B2 | 11/2015 | Bahukudumbi et al. | |
| 9,194,065 B2 | 11/2015 | Moore et al. | |
| 9,212,435 B2 | 12/2015 | Petersen et al. | |
| 9,283,501 B2 | 3/2016 | Wertz | |
| 9,352,267 B2 | 5/2016 | Krupnikov | |
| 9,353,481 B2 | 5/2016 | Gupta | |
| 9,518,364 B2 | 12/2016 | Heiskanen et al. | |
| 9,522,357 B2 | 12/2016 | Kwok et al. | |
| 9,580,873 B2 | 2/2017 | Ono et al. | |
| 9,662,600 B2 | 5/2017 | Parker | |
| 9,662,601 B2 | 5/2017 | Matsuda et al. | |
| 9,718,020 B2 | 8/2017 | Healey | |
| 9,993,761 B2 | 6/2018 | Kwok et al. | |
| 2011/0168622 A1 | 7/2011 | Lucas | |
| 2011/0259813 A1 | 10/2011 | Wertz | |
| 2012/0175074 A1 | 7/2012 | Gupta et al. | |
| 2012/0183862 A1 | 7/2012 | Gupta | |
| 2012/0234748 A1 | 9/2012 | Little | |
| 2013/0233789 A1* | 9/2013 | Parker | B01D 39/18 |
| | | | 210/490 |
| 2014/0024724 A1* | 1/2014 | Kishimoto | A61K 8/42 |
| | | | 514/781 |
| 2014/0083066 A1 | 3/2014 | Bahukudumbi et al. | |
| 2014/0153995 A1* | 6/2014 | Lhoyer | A46B 9/021 |
| | | | 401/129 |
| 2015/0053627 A1 | 2/2015 | Silin | |
| 2015/0068973 A1 | 3/2015 | Bessonoff et al. | |
| 2015/0232391 A1* | 8/2015 | Ioroi | C05F 11/00 |
| | | | 71/23 |
| 2016/0023146 A1 | 1/2016 | Hampton et al. | |
| 2016/0038864 A1 | 2/2016 | Calcaterra et al. | |
| 2016/0214044 A1 | 7/2016 | Silin | |
| 2016/0220927 A1 | 8/2016 | Kwok et al. | |
| 2016/0296874 A1 | 10/2016 | Yasufuku et al. | |
| 2016/0361674 A1 | 12/2016 | Swaminathan | |
| 2017/0066210 A1 | 3/2017 | Wood et al. | |
| 2017/0128892 A1 | 5/2017 | Yu | |
| 2017/0225105 A1* | 8/2017 | Rogers | B01D 39/1615 |
| 2017/0232371 A1 | 8/2017 | Anantharamaiah et al. | |
| 2017/0233911 A1 | 8/2017 | Wang | |
| 2017/0296953 A1 | 10/2017 | Parker | |
| 2017/0312671 A1 | 11/2017 | Shim et al. | |
| 2017/0312672 A1 | 11/2017 | Topolenski | |
| 2017/0319994 A1 | 11/2017 | Parker | |
| 2018/0133632 A1 | 5/2018 | Tripp et al. | |
| 2018/0169923 A1* | 6/2018 | Whitcomb | B32B 5/022 |

OTHER PUBLICATIONS

Co-pending U.S. Appl. No. 15/936,997, filed Mar. 27, 2018; Barlow and Dema; now U. S. Patent Publication No. 2018 0280847.

Notification of Transmittal of the International Search Report and the Written Opinion of the International Searching Authority, or the Declaration dated May 24, 2018 received in International Application No. PCT/US2018/024751.

Office Communication received in co-pending U.S. Appl. No. 15/936,997 dated Nov. 8, 2019.

Office Communication received in co-pending U.S. Appl. No. 15/936,968 dated Nov. 27, 2019.

Office Communication received in co-pending U.S. Appl. No. 15/936,968 dated Aug. 3, 2020.

* cited by examiner

PROCESS FOR UTILIZING A HIGH EFFICIENCY SYNTHETIC FILTER MEDIA

CROSS REFERENCES TO RELATED APPLICATIONS

This application claims priority to U.S. Provisional Application No. 62/478,074 filed on Mar. 29, 2017, which is hereby incorporated by reference.

BACKGROUND

1. Field of the Invention

The present invention is generally related to filter media exhibiting a high efficiency and capacity. More particularly, the present invention concerns a high efficiency filter media for treating fuels and other liquids.

2. Description of the Related Art

There has been an increasing demand for engines and other manufacturing systems to be more energy efficient. As a result, the tolerances of such systems have become tighter. Due to these tightening tolerances, it has become increasingly challenging to maintain the cleanliness level of the particles in the fluids that lubricate and/or power these systems.

In order to meet the high efficiency requirements, smaller diameter fibers are utilized in the filter media used by these systems. Conventional filtration media generally contains a plurality of fibers, which includes a number inorganic fibers, such as microglass fibers. Recently, microglass fibers have been the most prevalent inorganic fiber used in the filter market. However, because microglass fibers are rigid, there are concerns that these fibers could be very abrasive and damage the systems if any piece of the fibers dislodges from the filtration media. Typically, inorganic fiber shedding from the filtration media matrix may occur when the media is part of an active fluid stream. The dislodged inorganic fibers can become part of the active fluid stream and potentially cause damage to parts downstream of the filter media.

Another issue with conventional filtration media containing inorganic fibers involves the disposal of the filtration media. Typically, a good performing filter has a depth filtration media design and, therefore, the filtration media reaches its life cycle when the media becomes loaded with particles at a defined pressure differential. At this point, the filtration media must be disposed of. Generally, incineration is the preferred method. However, the presence of the inorganic fibers in the conventional filtration media can result in a significantly higher ash content being produced during incineration.

Thus, there is still a need for a high efficiency and high capacity filtration media that does not exhibit the same drawbacks as filtration media currently being used in the market.

SUMMARY

One or more embodiments of the present invention generally concern a nonwoven filter media comprising a primary layer, wherein the primary layer comprises: (a) a synthetic microfiber; (b) a fibrillated cellulosic fiber; and (c) a monocomponent staple fiber. In such embodiments, the monocomponent staple fiber comprises at least one of (i) a lobed-shaped fiber, (ii) a bent fiber having an average effective length that is not more than 75 percent of the actual length, and (iii) a bent lobed-shaped fiber having an average effective length that is not more than 75 percent of the actual length.

One or more embodiments of the present invention generally concern a nonwoven filter media comprising a primary layer, wherein the primary layer comprises: (a) a synthetic microfiber; (b) a fibrillated cellulosic fiber; and (c) a staple fiber. In such embodiments, the nonwoven filter media can exhibit a BETA ratio equal to or greater than 200 at 1.5 microns.

One or more embodiments of the present invention generally concern a method for forming a nonwoven filter media. Generally, the method comprises: (a) blending a synthetic microfiber and a fibrillated cellulosic fiber to form a first homogeneous slurry; (b) blending a staple fiber with the first homogeneous slurry to form a second homogeneous slurry; and (c) forming the nonwoven filter media with the second homogeneous slurry.

One or more embodiments of the present invention generally concern a method for filtering a liquid. Generally, the method comprises passing the liquid through a nonwoven filtration media containing a primary layer, wherein the primary layer comprises: (a) a synthetic microfiber; (b) a fibrillated cellulosic fiber; and (c) a monocomponent staple fiber. In such embodiments, the monocomponent staple fiber comprises at least one of (i) a lobed-shaped fiber, (ii) a bent fiber having an average effective length that is not more than 75 percent of the actual length, and (iii) a bent lobed-shaped fiber having an average effective length that is not more than 75 percent of the actual length.

DETAILED DESCRIPTION

The present invention is generally related to a high capacity and high efficiency nonwoven filtration media comprising a gradient pore structure. As discussed below in further detail, the filtration media of the present invention can comprise thermoplastic synthetic microfibers, fibrillated cellulosic fibers, staple fibers of cellulosic derivatives and/or other thermoplastic materials, and a binder. Furthermore, the filtration media of the present invention may be produced without the use of glass, microglass, or any other in vitro fibers. Consequently, the filtration media of the present invention does not cause the same issues as conventional filtration media that comprises glass fibers and/or microglass fibers. Moreover, the filtration media of the present invention can be used to treat fuel, lubrication fluids, hydraulic fluids, various industrial process fluids, and various other industrial gases. In addition, the filtration media of the present invention can eliminate respiratory and dermal issues associated with glass exposure due to the absence of glass fibers and microglass fibers in the filtration media.

In various embodiments, the filtration media of the present invention comprises, consists essentially of, or consists of a primary layer. In certain embodiments, the filtration media only contains the primary layer and does not contain any other layers. Thus, any of the following disclosed characteristics and properties in regard to the "primary layer" may be directly applicable to the inventive filtration media itself. For example, the basis weight ranges disclosed for the primary layer can also apply to the inventive filtration media.

In other embodiments, the filtration media may comprise additional layers in addition to the primary layer. It should be noted that the below disclosure in regard to the primary layer can also apply to these additional secondary layers. In other words, these secondary layers may comprise the same components and/or properties as the primary layer. In various embodiments, the filtration media can comprise at least 1, 2, 3, 4, 5 or more additional layers in addition to the primary layer. Additional layers can be added on the influent side and/or the effluent side of the primary layer in order to influence critical parameters of the filtration media; for example, the dirt holding capacity, efficiency, rigidity, and/or droplet formation. These additional layers can be similar and/or dissimilar to the primary layer. For example, these additional layers can comprise dissimilar nonwovens, woven materials, polymeric meshes, metal meshes, and/or polymeric coated metal meshes.

In certain embodiments, the filtration media can comprise a supporting scrim layer. In such embodiments, the scrim layer can comprise a spun-bonded nonwoven layer, a melt blown nonwoven layer, a needle-punched nonwoven layer, a wet-laid nonwoven layer, a resin-bonded nonwoven layer, a woven fabric layer, a wire mesh layer, paper, or a combination thereof.

As discussed above, the primary layer of the filtration media can comprise various types of fibers. However, in various embodiments, the primary layer comprises little to no inorganic fibers, such as glass fibers and/or microglass fibers. For example, the primary layer can comprise less than 10, 5, 4, 3, 2, 1.5, 1, 0.5, or 0.1 weight percent of an inorganic fiber, such as glass and/or microglass. In certain embodiments, the primary layer and the resulting filtration media comprises substantially no inorganic fibers.

As noted above, the filter media of the present invention, in particular the primary layer, can comprise a synthetic microfiber, a fibrillated fiber, and a staple fiber. Each of these fiber types are described in greater detail below.

In various embodiments, the primary layer comprises at least one synthetic microfiber. As used herein, a "microfiber" refers to a fiber having a minimum transverse dimension (thickness) of less than 5,000 nm. As used herein, "minimum transverse dimension" denotes the minimum dimension of a fiber measured perpendicular to the axis of elongation of the fiber by an external caliper method. In various embodiments, the microfiber may have a minimum transverse dimension (thickness) of less than about 5, 4, 3, or 2 μm.

Additionally or alternatively, the microfibers can have a maximum transverse dimension (width) of less than about 20, 15, 10, 9, 8, 7, 6, 5, 4.5, 4, 3.5, 3, or 2.5 μm, but greater than about 400, 500, 600, 700, 800, 900, or 1,000 nm. As used herein, "maximum transverse dimension" is the maximum dimension of a fiber measured perpendicular to the axis of elongation of the fiber by the external caliper.

Generally, the minimum transverse dimension and the maximum transverse dimension should be nearly identical for microfibers having a round-shaped cross-section. However, these dimensions may greatly vary if microfibers containing different cross-sectional shapes are used (e.g., ribbon-shaped, lobed-shape, x-shape, clover-shaped, etc). In one or more embodiments, the microfibers can have a transverse aspect ratio of at least 1:1, 1.25:1, 1.5:1, 1.75:1, 2:1, 3:1, 4:1, 5:1, 10:1, 50:1, or 100:1. Additionally or alternatively, the microfibers can have a transverse aspect ratio of less than 10,000:1, 5,000:1, 1,000:1, 500:1, 100:1, 50:1, 20:1, 10:1, 5:1, 4:1, 3:1, 2.5:1, 2:1, 1.75:1, or 1.5:1. As used herein, "transverse aspect ratio" denotes the ratio of a fiber's maximum transverse dimension (width) to the fiber's minimum transverse dimension (thickness).

As used herein, "external caliper method" denotes a method of measuring an outer dimension of a fiber where the measured dimension is the distance separating two coplanar parallel lines between which the fiber is located and where each of the parallel lines touches the external surface of the fiber on generally opposite sides of the fiber.

Further instructions on how to measure the "minimum transverse dimension" and "maximum transverse direction" of the fibers are provided in U.S. Patent Application Publication No. 2012/0175074, the teachings of which are incorporated herein by reference in their entirety.

Generally, continuous and/or discontinuous synthetic microfibers can be used to impart efficiency and/or capacity to the filtration media. For instance, the synthetic microfibers can have an average length of at least 0.5, 1, 1.5, 2, 3, 4, or 5 mm and/or not more than 100, 75, 50, 25, or 20 mm.

Typically, the main function of the microfiber is to develop solidity and contribute a desired pore structure. A suitable microfiber is available from Eastman Chemical, under the tradename Cyphrex®. The synthetic microfibers can comprise polyester, polyethylene, polypropylene, polyamide, or a combination thereof.

In one or more embodiments, the primary layer comprises at least 1, 5, 10, 15, 20, 25, 30, 35, 40, 45, or 50 weight percent of at least one synthetic microfiber. Additionally or alternatively, the primary layer can comprise less than 99, 95, 90, 85, 80, 75, 70, 65, 60, 55, 50, 45, 40, 35, 30, 25, 20, 15, or 10 weight percent of at least one synthetic microfiber.

In various embodiments, the primary layer comprises a fibrillated cellulosic fiber. In certain embodiments, the fibrillated cellulosic fiber can comprise a nanofibrillated cellulosic fiber.

In one or more embodiments, the fibrillated cellulosic fiber can have a Canadian Standard Freeness of less than 400, 300, 200, 100, 50, 25, 20, or 15 mL. In preferred embodiments, the fibrillated cellulosic fiber has a Canadian Standard Freeness of about 10 to 40 mL.

In one or more embodiments, the preferred fibrillated cellulosic materials comprise nanofibrillated cellulose, cellulose filaments, and/or nanofibrillated cellulose derivatives, such as Lyocell.

The aforementioned nanofibrillated cellulosic fibers may contain fibrils with an average diameter of less than 100 nanometer (nm) and fibrils with an average diameter of up to 1,000 nm. Generally, the fibrillated cellulosic materials contain fibrils with an average width of less than 1,000 nm. The freeness of the fibrillated cellulosic fiber can be attributed to the nano-sized branches of the fiber. In certain embodiments, the average diameter of the fibrils is less than 750 nm. Furthermore, in various embodiments, the fibrillated cellulosic fiber has an aspect ratio of at least 1,000, 2,500, or 5,000 and/or not more than 10,000, 9,000, and 8,000.

Generally, the primary layer can comprise at least 0.5, 1, 5, 10, 15, 20, 25, 30, 35, or 40 weight percent of the fibrillated cellulosic fiber. Additionally or alternatively, the primary layer can comprise not more than 99, 95, 90, 85, 80, 75, 70, 65, 60, 55, 50, 45, 40, 35, 30, 25, 20, 15, or 10 weight percent of the fibrillated cellulosic fiber.

Compared to most synthetic fibrillated fibers, nanofibrillated cellulosic fibers can have a large surface area of exposed hydroxyl functional groups that promote increased fiber-fiber hydrogen bonding. Fiber-fiber hydrogen bonding is a mechanism that can create additional internal strength of the primary layer. Furthermore, the hydroxyl groups create bonding sites for other polymeric compounds, including those with ether bonds. The bonds between the cellulose and the aldehyde can enhance the wet strength of the filtration media and the media's resistance to chemical degradation.

The fibrillated cellulosic materials also contain exposed carboxyl groups, which can provide anionic absorption sites for polymeric compounds due to the high degree of fibrillation. Consequently, the fibrillated cellulosic fibers can enhance the internal bonding strength of the fibers within the primary layer.

In certain embodiments, at least a portion of the fibrillated cellulosic fiber can be replaced by a glass fiber, such as microglass fibers. For example, the primary layer can comprise a fibrillated cellulosic fiber to glass fiber weight ratio of less than 20:1, 15:1, 10:1, 5:1, 4:1, 3:1, 2:1, 1:1, 0.5:1, or 0.1:1. Additionally or alternatively, the primary layer can comprise a fibrillated cellulosic fiber to glass fiber weight ratio of at least 0.1:1, 0.5:1, 1:1, 1.5:1, 2:1, 2.5:1, 3:1, 4:1, 5:1, 6:1, 7:1, 8:1, 9:1, or 10:1.

In other embodiments, glass fibers can replace substantially all of the fibrillated cellulosic fibers in the primary layer. For instance, in such embodiments, the primary layer can comprise substantially no fibrillated cellulosic fiber.

In certain embodiments, the primary layer can comprise at least 0.5, 1, 5, 10, 15, 20, 25, 30, 35, or 40 weight percent of one or more glass fibers. Additionally or alternatively, the primary layer can comprise not more than 99, 95, 90, 85, 80, 75, 70, 65, 60, 55, 50, 45, 40, 35, 30, 25, 20, 15, or 10 weight percent of one or more glass fibers. In another embodiment of the invention, the primary layer has a substantial absence of glass fibers.

In certain embodiments, a water dispersible wet strength polymer can be added to the primary layer to enhance the rewet strength of the resulting filtration media. The wet strength polymer can interact with the cellulosic fibers, thereby creating water resistant interfiber crosslinked bonding. Generally, this crosslinking of the polymeric network occurs thermally. Typical wet-strength polymers include, but are not limited to, urea-formaldehyde, melamine-formaldehyde, and polyamine-epichlorohydrin.

In various embodiments, the primary layer may comprise a staple fiber. As used herein, a "staple fiber" refers to a fiber having discrete length. The staple fibers can comprise discontinuous fibers, which can be used to alter the pore structure, hydrophilicity, hydrophobicity, oleophilicity, oleophobicity, electrostatic discharge, capacity, and/or internal bond strength of the resulting filtration media. Generally, the staple fibers can have a cut length of 0.1 mm to 75 mm; however, a cut length of 3 mm to 10 mm is generally preferred. Furthermore, the staple fibers typically can have an average diameter of 5 μm to 50 μm; however, an average diameter of 5 μm to 20 μm is generally preferred. In other embodiments, the staple fiber can have a denier of at least 0.3, 0.5, 0.75, 1, 1.25, or 1.5 and/or less than 5, 4, 3, 2, or 1.75 denier.

Depending on the final use application, the staple fiber can be made of polyester, nylon, polypropylene, cellulose acetate, polyethylene, phenolic resins, polyacrylonitrile, polyacrylonitrile, carbon, oxidized polyacrylonitrile, viscose rayon, cotton, polylactic acid, polyimide, polyamide, poly (p-phenylene sulfide) (PPS), polyether ether ketone (PEEK), polyvinylidene fluoride, glass, polytetrafluoroethylene (PTFE), or combinations thereof. In certain embodiments, the staple fiber can comprise a cellulose derivative, such as cellulose acetate.

Staple fibers can be utilized with a crimp to impart bulkiness to the filtration media and thereby improving the dirt holding capacity of the media. In such embodiments, the staple fibers can comprise a crimping frequency greater than 2, 3, 4, 5, 6, 7, 8, 9, or 10 crimp pitch peaks per 10 mm of fiber.

Additionally or alternatively, staple fibers with different cross-sections can be utilized to impart bulkiness and additional surface area in the filtration media, thereby improving the efficiency and dirt holding capacity of the media. For example, the staple fibers can have a non-round cross-sectional shape, such as a lobed shape. In various embodiments, the staple fibers can comprise non-circular fibers. As used herein, "non-circular fibers" refer to fibers having an average cross-sectional perimeter dimension that is at least 125 percent greater than the average cross-sectional perimeter dimension of equivalent circular fibers having the same cross-sectional area as the non-circular fibers. In one or more embodiments, the non-circular fibers have an average cross-sectional perimeter dimension that is at least 125, 150, 200, 250, 300, 350, or 400 percent greater than the average cross-sectional perimeter dimension of equivalent circular fibers having the same cross-sectional area as the non-circular fibers. In certain embodiments, the staple fibers can be non-circular fibers having a lobed-shaped cross section, a clover leaf-shaped cross section, a triangular-shaped cross section, an X-shaped cross-section, or a flat-shaped cross section.

In one or more embodiments, the staple fibers have a lobed-shape cross section. In various embodiments, the staple fibers have a cross-sectional lobed-shape comprising at least 1, 2, 3, 4, 5, 6, 7, or 8 lobes. In certain embodiments, the staples fibers have a trilobal (Y) cross-sectional shape.

In one or more embodiments, the staple fiber comprises a bent fiber, a lobed-shaped fiber, a bent lobed-shape fiber, or a combination thereof. In such embodiments, "bent" refers to fibers having an average effective length that is not more than 75 percent of the actual length of the bent fibers. As used herein, "effective length" refers to the maximum dimension between any two points of a fiber. Furthermore, "actual length" refers the end-to-end length of a fiber if it were perfectly straightened. If a fiber is straight, its effective length is the same as its actual length. However, if a fiber is curved and/or crimped, its effective length will be less than its actual length, where the actual length is the end-to-end length of the fiber if it were perfectly straightened. If a fiber is highly curved or entangled, the effective length of the fiber may not be measured between the ends of the fiber; but, instead, will be measured between the two points on the fiber that are farthest apart from one another. For example, if a fiber is curved into a circular shape with its ends touching, the effective length of the fiber will be the diameter of the circle formed by the fiber. In various embodiments, the bent fibers have an average effective length that is not more than 75, 50, 40, 30, or 20 percent of the actual length of the bent fibers. As used herein, the terms "bent" and "crimped" may be used interchangeably.

In certain embodiments, the staple fiber comprises a monocomponent fiber. As used herein, a "monocomponent fiber" refers to a fiber formed from a single component. For example, a monocomponent fiber could include a fiber made entirely from polyester or a polyolefin. A monocomponent fiber would not include any bicomponent fibers or other types of multicomponent fibers. In one or more embodiments, the primary layer does not comprise a multicomponent fiber.

In one or more embodiments, the primary layer comprises at least 1, 5, or 10 weight percent and/or not more than 90, 80, 70, 60, or 50 weight percent of at least one staple fiber.

In various embodiments, a polymeric binder can be added to the primary layer in order to enhance the internal strength and/or water repellence of the resulting filtration media. The polymeric binder can be applied using, for example, beater addition, secondary coating (e.g., dip and squeeze, kiss and mull, blade, spray, and/or weir), and/or other bonds methods (e.g., spray or curtain coating and post saturation methods). Moreover, in various embodiments, the binders may fill the interstitial pores of the filtration media.

In one or more embodiments, the primary layer can comprise at least 0.5, 1, 5, or 10 weight percent and/or not more than 50, 45, 40, 35, 30, 25, 20, or 15 weight percent of one or more polymeric binders. Generally, the additional percentage is such that the polymeric binders do not form a film between the pores in the primary layer. The polymeric binders can be, but are not limited to, copolyesters, polyesters, polyethylene, polyvinyl alcohol, siloxane, fluoropolymers, epoxy resins, phenolic resins, starch, melamine formaldehyde, urea formaldehyde, polyvinyl acetate, ethylene vinyl chloride, polyvinyl chloride, polyvinylidine chloride, polyvinyl alcohol, styrene butadienes, acrylates, and/or alginic acids. Furthermore, additional functionality can be imparted to the filtration media based on the functionality of the polymer, for example, water and/or oil repellence.

The primary layer may comprise a basis weight of at least 10, 15, 20, 25, or 30 and/or not more than 300, 250, 200, 175, or 150 g/m². In certain embodiments, the primary layer may comprise a basis weight in the range of 30 to 200 g/m².

Furthermore, in various embodiments, the primary layer can exhibit a dirt holding capacity ("DHC") of at least 5, 10, 15, 20, 25, 30, 35, 40, 45, 50, or 55 g/m² as measured according to ISO 16889. In addition, in one or more embodiments, the primary layer can exhibit a BETA Ratio equal to or greater than 100, 200, 500, 750, or 1,000 at 1.5, 2, 2.5, 3, 3.5, 3.7, 4, 5, 6, 7, 8, 9, or 10 microns and larger as measured according to ISO 16889.

In various embodiments, the primary layer can exhibit a permeability of less than 100, 50, 25, 10, or 5 cfm/sf as measured according to ASTM D737.

In one or more embodiments, the primary layer can have a max pore size of not more than 100, 75, 60, 50, or 40 µm as measured according to ASTM 1294.

Additionally or alternatively, the primary layer can comprise an average thickness of less than 100, 75, 50, 40, or 30 mils. In other embodiments, the primary layer can have an average thickness of less than 2, 1, or 0.75 mm.

The primary layer may be produced using a wet-laid and/or dry-laid nonwoven process. In certain embodiments, the primary layer is preferably produced by a wet-laid process.

Based on the production process described herein, the resulting primary layer contains varying pore sizes in the Z-direction. Consequently, this gradient pore formation in the resulting primary layer and filtration media can greatly facilitate the media's ability to filter out small particulates from various fluids.

In various embodiments, the method for forming the primary layer of the filtration media involves: (a) blending a synthetic microfiber and a fibrillated cellulosic fiber to form a first homogeneous slurry; (b) blending a staple fiber with the first homogeneous slurry to form a second homogeneous slurry; and (c) forming the nonwoven filter media with the second homogeneous slurry. As used herein, a "homogeneous slurry" refers to a uniform mixture that only comprises a single phase. In contrast, a "heterogeneous slurry" would contain multiple visibly distinct phases, components, and/or substances. The formation of these homogeneous slurries during the wet-laid process can be important for forming the pore gradients in the inventive filtration media. For instance, the use of heterogeneous slurries during nonwoven production can result in the formation of inconsistent and non-uniform pore gradients in the resulting filtration media. In contrast, the use of homogeneous slurries when producing the nonwoven filter media allows the formation of more consistent and uniform pore gradients in the resulting filtration media.

In one or more embodiments, the wet laid process involves dispersing the fibers in water before the substrate is formed for that embodiment. In certain embodiments, the fibers can be dispersed separately in water and blended in the machine chest. In alternative embodiments, the fibers can be combined before being dispersed into the machine chest. Generally, the desired layers can be produced with a conventional wet-laid process using a wet-laid machine and general knowledge known in the art.

Generally, in various embodiments, the solvent portion of the fiber slurries generally comprises water; however, the water may also contain various chemicals to assist with the wet-laid process. The chemicals can include, but are not limited to, an acid, a base, a surfactant, a wet strength resin, cationic polymers, anionic polymers, nonionic polymers, and various copolymers.

During the wet-laid process, the fibrillated cellulosic fiber and the synthetic microfiber are first pre-blended under high mechanical energy to form a first homogeneous slurry. During this pre-blending step, the fibers are properly opened and do not necessarily become entangled. The fibers may be subjected to agitation during this stage in order to further open up the fibers. In particular, the branches on the fibrillated cellulosic fibers can begin to open up during this stage. After forming the first homogeneous slurry, the staple fibers can be blended with this slurry to form a second homogeneous slurry.

Generally, in order to fully homogenize the fiber slurries, the correct amount of mechanical, chemical, and thermal energy must be applied to the slurry mixture. Typically, appropriate fiber blending is required when forming the homogenous slurries during the wet-laid process in order to achieve the desired filtration characteristics.

After forming the second homogeneous slurry, the filter media may be produced using conventional wet-laid processes. For example, the slurry concentration can be significantly reduced and pumped over a continuously moving screen to thereby form a nonwoven wet media. When transferred to the aforementioned screen, a major percentage of the fluid(s) can be removed using gravity, vacuums, foils, steam, and/or other energy sources. The wet media can then be conveyed through a thermal dryer section to remove the majority of the remaining fluid(s), thereby establishing bond sites of the fibers and/or binders. In certain embodiments, other energy sources may be utilized within the thermal dryer section; for example, infrared and/or ultra violet sources.

The resulting primary layer can be dried using conventional methods known in the art.

After drying, the resulting filtration media can be saturated with a binder. Alternatively, the binder may be added prior to the drying step. In such embodiments, for example, the second homogeneous slurry may be blended with the binder to form a third homogeneous slurry, which can then be subjected to the drying step. The addition of a binder at this stage can enhance the rigidity of the filtration media in the Z-direction. In other words, the addition of a binder at this stage can increase the bulk rigidity of the filtration media. Consequently, this can enhance the stability of the filtration media by preventing the disintegration of the fibrous structure and the premature collapse of the internal pore structure.

Bonding of the formed web can be performed during the wet-laid process or by utilizing an offline saturation process. Based on the solubility of the desired binder, a diluent may be used therewith to facilitate its application. Such diluents can include, for example, aqueous and/or alcohol diluents. The main purpose of binder impregnation is to improve the internal strength of the media; however, other properties such as tear strength, dimensional stability, and compression may also be altered through the addition of a binder. In addition, secondary functional additives can be used to impart favorable characteristics to the resulting filtration media. For example, imparting oleophobicity and/or hydrophobicity is very popular and can be imparted using flouro-based compounds, silicon-based compounds, and other block chain co-polymers. Other popular additives include absorbents, flame retardants, and/or anti-microbial agents. Secondary functional additives can be used with or without the primary binder to impart the desired characteristics.

As noted above, the primary layer of the filtration media can provide gradient filtration, which provides pores of different sizes in the Z-direction, due to the wet-laid process used to the produce the filtration media of the present invention. In particular, the interstitial pores in the filtration media of the present invention are utilized to remove contaminants from a fluid.

The filtration media of the present invention can be capable of removing solid particles as small as about 1 μm at an efficiency of at least 50 percent at a very low pressure drop. The filtration media is also capable of coalescing very small water droplets in a hydrocarbon fluid, such as diesel fuel, into larger droplets, which enables the separation of the water from the fluid using external forces.

As noted above, the filtration media of the present invention can be used to treat various fluids, including hydrocarbon fuels (e.g., diesel fuel), lubrication fluids, hydraulic fluids, industrial process water, industrial process fluids, and various industrial gases. Generally, the fluid to be treated is passed through the filtration media in order to remove undesirable contaminants therein. Thus, in certain embodiments, the filtration media of the present invention can be used to filter various types of liquids.

In alternative embodiments, the filtration media of the present invention can be used as an air filtration media to filter air and various other types of gases. For example, in certain embodiments, the filtration media comprises air filtration media.

In various embodiments, the filtration media of the present invention can be used at temperatures ranging from −42° C. to 130° C. and can effectively remove particulates having a size in the range of 1 to 15 μm, in particular particulates having a size in the range of 5 μm and larger at very high efficiencies.

As noted above, the filtration media of the present invention can be used as a filtration element that can be placed in an active fluid stream (liquid or gaseous) to remove a portion of particulates and/or aerosol therefrom. The predominant filtration mechanism for removing particles in liquids is via sieving. Therefore, this can make the size of the particles to be removed highly dependent on the interfiber spacing in the filtration media. Thus, the removal of smaller particles require interfiber spacing smaller than the particles to be removed. In addition, the high efficiency and high capacity filtration media of the present invention may also perform as a coalescing media or as a part of a coalescing media with a low pressure drop.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Four separate filtration media samples were produced based on the formulations listed in Table 1, below. All listed percentages are the weight percentage of the listed component based on the total weight of the filtration medium.

TABLE 1

|  | A | B | C | D |
|---|---|---|---|---|
| Cyphrex ® 10002 (Microfiber) | 45% | 45% | 45% | 45% |
| EFT L040 (Fibrillated Lyocell) | 20% | 20% | 20% | 20% |
| Lubrizol 26138 (Acrylic Binder) | 15% | 15% | 15% | 15% |
| Barnet P145 (Staple Fiber) |  | 20% |  | 20% |
| Teijin RA034 (Staple Fiber) | 20% |  | 20% |  |

The above samples were formed into filtration media utilizing the following process: (1) a hand sheet mold was filled with water to about 70% full; (2) an industrial lab blender was also filled with water to about 75% full and the Cyphrex® microfibers (Eastman Chemical) and the fibrillated lyocell (Engineered Fibers Technology) were added to the blender; (3) the slurry of water, microfibers, and fibrillated lyocell was blended until a first homogeneous slurry was formed; (4) the staple fibers, Barnet P145 (Barnet) and Teijin RA034 (Teijin), were added to the first homogeneous slurry and blended therewith in a blender to form a second homogeneous slurry; (5) the binder (Lubrizol 26138 acrylic binder) was added to the second homogenous slurry in a blender and blended therewith to form a third homogeneous slurry; (6) a coagulant/flocculent (aluminum sulfate) was then added and blended with the third homogeneous slurry under low agitation until a pH of 4.8 to 5.0 was achieved in order to precipitate the binder; (7) the slurry was then transferred to the hand sheet mold and the substrate was formed; and (8) the substrate was then removed from the mold and then transferred to an oven to be dewatered and dried at about 150° C.

After forming the filtration media using the above process, the resulting filtration media was subjected to various physical tests and flat sheet tests.

The Basis Weight (BSWT) was measured according to ASTM D461, in units of pounds per 3,000 square feet. This can also be expressed as grams per square meter (gsm or $g/m^2$).

The Permeability was measured using a TexTest Instruments FX3300, measured according to ASTM D737. Units were recorded in CFM at 125-Pa.

The caliper thickness was measured using a Thwing-Albert Pro Gage according to TAPPI Standard T411. Units were recorded in mm.

The max pore size (Bubble Point) was measured using a PMI BPT-102A Bubble Point Tester, measured according to ASTM 1294. Units were recorded in micrometers.

The tensile was measured using a Thwing-Albert EJA-Series according to ASTM D461. Units were recorded in pounds per inch.

The flat sheet testing was done according to a modified ISO 19438 Multipass Test at a superficial face velocity of 0.508 cm/s. The test was run to 172 kPa differential pressure utilizing I5012103-1, A2 Fine Test Dust with a base upstream gravimetric level of 5.

The result of the physical and flat sheet testing is depicted in Table 2, below.

TABLE 2

|  | A | B | C | D |
|---|---|---|---|---|
| Basis Weight (gsm) | 112.1 | 139.0 | 133.3 | 111.8 |
| Caliper (mm) | 0.67 | 0.60 | 0.59 | 0.54 |
| Permeability (CFM) | 6.85 | 4.4 | 3.5 | 4.97 |
| Max Pore size (μm) | 34.8 | 27.4 | 26.8 | 27.28 |
| ABS, BETA Rating | 1,000 @ 10 μm | 1,000 @ 8 μm | 1,000 @ 7 μm | 1,000 @ 9 μm |
| Dirt Holding Capacity (g/m$^2$) | 56 | 55 | 56 | 60 |

Example 2

The samples depicted in Table 3 were prepared using the process previously described in Example 1, except the latex binder PD 2158 (HB Fuller) was added as a post-treatment component after the media was formed. This binder could be diluted in either water or alcohol. The method used for applying the binder was a standard process well known in the art. All listed percentages are the weight percentage of the listed component based on the total weight of the filtration medium, except for the listed binder, which is based on the weight percentage of the binder relative to the rest of the components making up the filtration media.

TABLE 3

|  | A | B | C |
|---|---|---|---|
| Cyphrex ® 10001 | 15% | 15% | 15% |
| Cyphrex ® 10002 | 35% | 45% | 40% |
| Lyocel L-10-4 | 25% |  | 20% |
| Lyocell L-40-6 |  | 20% |  |
| Cellulose Acetate 1.8 × 3 mm | 25% |  | 20% |
| P145 × 6 mm |  | 20% |  |
| Latex binder PD 2158 | 15% | 15% | 15% |

The properties of the filtration media were measured according to the tests discussed above in Example 1. The results of these tests are depicted in Table 4.

TABLE 4

|  | A | B | C |
|---|---|---|---|
| Basis weight (gsm) | 127.9 | 126.9 | 133 |
| Caliper (mm) | 0.620 | 0.653 | 0.565 |
| Air Permeability (cfm) | 2.78 | 4.02 | 5.11 |
| Mean Flow Pore (μm) | 2.15 | 2.84 | 3.26 |
| ABS Beta Rating | >1000 @ 3.7 μm | >1000 @ 4.5 μm | >1000 @ 5 μm |
| Dust Holding Capacity (g/m$^2$) | 47.4 | 52.5 | 57.4 |

Example 3

The samples depicted in Table 5 illustrate the use of fibrillated cellulose fibers mentioned previously. They were prepared using the process previously described in Example 1, except the latex binder PD 2158 (HB Fuller) was added as a post-treatment component after the media was formed. This binder could be diluted in either water or alcohol. The method used for applying the binder was a standard process well known in the art. All listed percentages are the weight percentage of the listed component based on the total weight of the filtration medium, except for the listed binder, which is based on the weight percentage of the binder relative to the rest of the components making up the filtration media.

TABLE 5

|  | A | B | C | D |
|---|---|---|---|---|
| Cyphrex ® 10001 | 15% | 15% | 15% | 20% |
| Cyohrex ® 10002 | 35% | 30% | 35% | 35% |
| 100 L—10 ml CSF* |  |  | 25% | 20% |
| 100 L—30 ml CSF* | 25% | 30% |  |  |
| 100 L—100 ml CSF* |  |  |  |  |
| Cellulose Acetate 1.8 × 3 mm | 25% | 25% | 25% | 25% |
| Latex binder PD 2158 | 10% | 10% | 10% | 10% |

*100L is microfibrillated cellulose fiber by International Paper with the trade name of "Interlace" and Canadian Freeness of 10, 30, 100 ml respectively.

The properties of the filtration media were tested according to the tests discussed above in Example 1. The results of these tests are shown Table 6.

TABLE 6

|  | A | B | C | D |
|---|---|---|---|---|
| Basis Weight (gsm) | 114 | 114 | 124 | 120 |
| Caliper (mm) | 0.497 | 0.484 | 0.565 | 0.618 |
| Air Permeability (cfm) | 3.79 | 2.75 | 2.76 | 3.59 |
| ABS Beta Rating | 1000 > 3.6 μm | 1000 > 2.7 μm | 1000 > 2.8 μm | 1000 > 3.8 μm |
| Dirt Holding Capacity (g/m$^2$) | 45.4 | 38 | 40.5 | 44.4 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A method for filtering a liquid, said method comprising: passing said liquid through a nonwoven filtration media containing a primary layer, wherein said primary layer comprises:
(a) a synthetic microfiber;
(b) a fibrillated cellulosic fiber; and
(c) a monocomponent staple fiber comprising at least one of (i) a lobed-shaped fiber, (ii) a bent fiber having an average effective length that is not more than 75 percent of the actual length, and (iii) a bent lobed-shaped fiber having an average effective length that is not more than 75 percent of the actual length.

2. The method of claim 1, wherein said liquid comprises a hydrocarbon fuel, a lubrication fluid, a hydraulic fluid, other industrial process fluids, and combinations thereof.

3. The method of claim 1, wherein said primary layer comprises less than 5 weight percent of an inorganic fiber.

4. The method of claim 1, wherein said primary layer comprises less than 1.5 weight percent of a glass fiber and/or a microglass fiber.

5. The method of claim 1, wherein said monocomponent staple fiber comprises said bent lobed-shaped fiber.

6. The method of claim 1, wherein said primary layer comprises at least 5 weight percent and not more than 80 weight percent of said synthetic microfiber.

7. The method of claim 1, wherein said primary layer comprises at least 0.5 and not more than 50 weight percent of said fibrillated cellulosic fiber.

8. The method of claim 1, wherein said primary layer comprises at least 5 and not more than 70 weight percent of said monocomponent staple fiber.

9. The method of claim 1, wherein said primary layer is a wet-laid nonwoven.

10. The method of claim 1, wherein said monocomponent staple fiber comprises a cellulose derivative.

11. The method of claim 1, wherein said primary layer comprises at least 1 weight percent and not more than 45 weight percent of said synthetic microfiber.

12. The method of claim 1, wherein said monocomponent staple fiber comprises said bent fiber.

* * * * *